US006604799B2

(12) United States Patent
Searby et al.

(10) Patent No.: US 6,604,799 B2
(45) Date of Patent: Aug. 12, 2003

(54) CONFIGURABLE AIR VENTS ON A COMPUTER ENCLOSURE

(75) Inventors: Tom J Searby, Ft. Collins, CO (US); Paul B. Black, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 21 days.

(21) Appl. No.: 09/903,082

(22) Filed: Jul. 10, 2001

(65) Prior Publication Data

US 2003/0011287 A1 Jan. 16, 2003

(51) Int. Cl.[7] ................................................ H05K 7/18
(52) U.S. Cl. ................................ 312/223.2; 312/265.5
(58) Field of Search .......................... 312/223.2, 265.5, 312/265.6, 213; 454/184

(56) References Cited

U.S. PATENT DOCUMENTS

| | | | | |
|---|---|---|---|---|
| 4,743,281 A | * | 5/1988 | Kennedy et al. | 55/493 |
| 5,216,582 A | * | 6/1993 | Russell et al. | 361/685 |
| 5,297,004 A | * | 3/1994 | Mazura | 361/690 |
| 5,547,272 A | * | 8/1996 | Paterson et al. | 312/223.2 |
| 5,583,743 A | * | 12/1996 | Levins et al. | 361/683 |
| 5,683,156 A | * | 11/1997 | Chen et al. | 312/223.2 |
| 5,768,097 A | * | 6/1998 | Jelinger | 361/683 |
| 5,935,282 A | * | 8/1999 | Lin | 55/385.6 |
| 5,955,955 A | * | 9/1999 | Corcoran et al. | 340/607 |
| 5,957,556 A | * | 9/1999 | Singer et al. | 312/223.6 |
| 6,252,770 B1 | * | 6/2001 | Yu et al. | 361/695 |

FOREIGN PATENT DOCUMENTS

JP 8-69053 * 3/1996

* cited by examiner

*Primary Examiner*—Janet M. Wilkens
(74) *Attorney, Agent, or Firm*—Kevin M. Hart

(57) ABSTRACT

A computer having configurable air vents. A louver assembly may be attached to the computer enclosure or removed therefrom so that the enclosure may be adapted to the environment in which it will be used. For a desktop or other office environment, the louver assembly may be attached to the computer enclosure. For an industrial or rack-mount setting, the louver assembly may be removed. The louver assembly may be mounted in a bezel, which itself may be removably attached to the computer enclosure. A catch on the louver assembly engages a corresponding hole or depression in the enclosure or bezel, forming a detent. The holding force of the detent may be overcome by pushing the louver assembly out of the enclosure or bezel by hand, but is sufficiently strong to hold the louver assembly in place during normal operation of the computer.

12 Claims, 4 Drawing Sheets

CONFIGURABLE AIR VENTS ON A COMPUTER ENCLOSURE

FIELD OF THE INVENTION

This invention relates to computer enclosures.

BACKGROUND

Most computers require air flow paths through the enclosure and chassis for the purpose of cooling components disposed inside the chassis. Criteria that apply during the design of such air flow paths vary, however, depending on the environment in which the computer will be operated. For computers used on or beside a desktop, aesthetic and acoustic considerations apply: Inlet and outlet air flow openings should not be unsightly if they are located on visible surfaces of the enclosure; and noise generated by components inside the computer (such as by cooling fans) should not be objectionable. On the other hand, for computers used in a rack-mount setting such as in a computer room, aesthetic and acoustic considerations no longer apply. Instead, close proximity of computers in the rack-mount arrangement dictates that inlet and outlet air flow openings be unimpeded so as to maximize cooling efficiency.

SUMMARY OF THE INVENTION

In one aspect, the invention includes a computer having configurable air vents. A louver assembly may be attached to the computer enclosure or removed therefrom so that the enclosure may be adapted to the environment in which it will be used. For a desktop or other office environment, the louver assembly may be attached to the computer enclosure. For an industrial or rack-mount setting, the louver assembly may be removed.

In another aspect, the at least one louver assembly is mounted in a bezel, which itself may be removably attached to the computer enclosure. The bezel may be designed to attach to any surface of the enclosure.

In another aspect, the invention includes a design for facilitating easy attachment and removal of the louver assembly to and from the computer enclosure or bezel. A catch on the louver assembly (or enclosure or bezel) engages a corresponding hole or depression in the enclosure or bezel (or louver assembly), forming a detent. The holding force of the detent may be overcome by pushing the louver assembly out of the enclosure or bezel by hand, but is sufficiently strong to hold the louver assembly in place during normal operation of the computer.

The invention allows a single computer enclosure to be used in either an office/desktop setting or in an industrial/rack-mount setting. When the louver assembly is in place, aesthetics of the computer enclosure are improved because the chassis and internal components of the computer are substantially hidden from view. In addition, acoustics are improved because the louver assembly minimizes and deflects noises that are produced within the computer enclosure. When the louver assembly is removed, cooling efficiency is maximized because nothing blocks or impedes the air flow paths of the computer chassis. The bezel/louver assembly combination provides continuity of appearance between the office/desktop configuration and the industrial/rack-mount configuration of the computer.

DETAILED DESCRIPTION OF THE PREFERRED EMBODIMENTS

Figure 1:
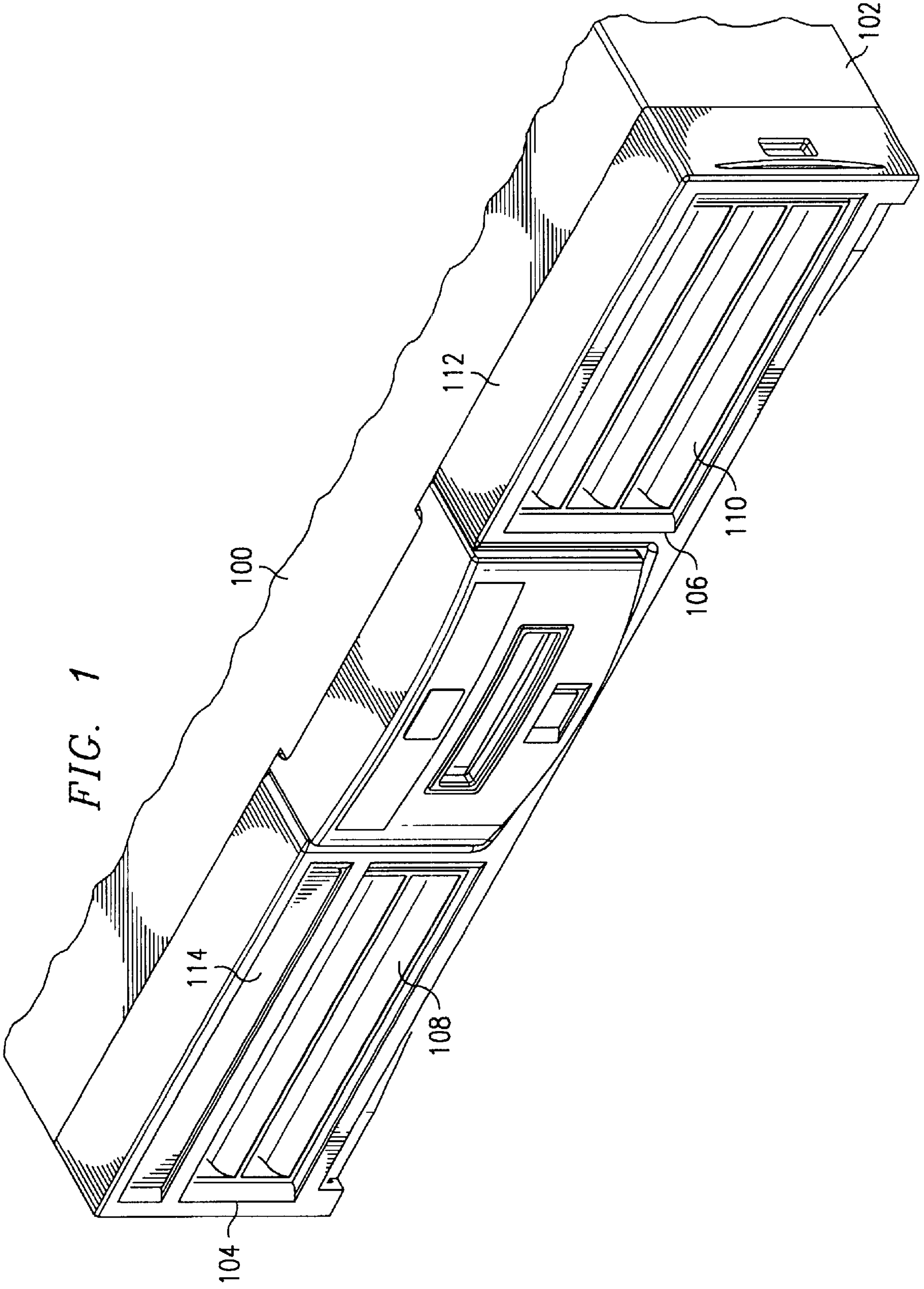
FIG. 1 is an oblique view of the front of a computer enclosure bezel that incorporates preferred embodiments of the invention.

FIG. 1 illustrates, by way of example, a computer 100 that includes configurable air vents according to a preferred embodiment of the invention. Computer 100 includes an enclosure 102. Enclosure 102 includes first and second openings 104, 106 for removably receiving first and second louver assemblies 108, 110 as shown. In the embodiment shown, louver assemblies 108, 110 deflect downward any noise tending to travel from the inside of enclosure 102 to the outside of computer 100, but they allow air to flow in or out for cooling purposes. In addition, the louvers tend to visually obscure the components of the computer, such as the chassis, that are internal to enclosure 102. The louver assemblies in the illustrated embodiment are shown on left and right sides of the front surface. Alternative embodiments may have fewer louver assemblies or more louver assemblies than computer 100. In addition, the louver assemblies may be located on surfaces other than the front surface of enclosure 102. The louver assemblies may mount directly to enclosure 102, or they may be mounted to a removable bezel or plate 112. The louver assemblies need not all be the same size, or include the same number of louvers. For example, in the embodiment shown, louver assembly 108 includes two louvers while assembly 110 includes three louvers; louver assembly 108 is shorter than assembly 110 to provide clearance for other components, such as a media drive 114.

Figure 2:
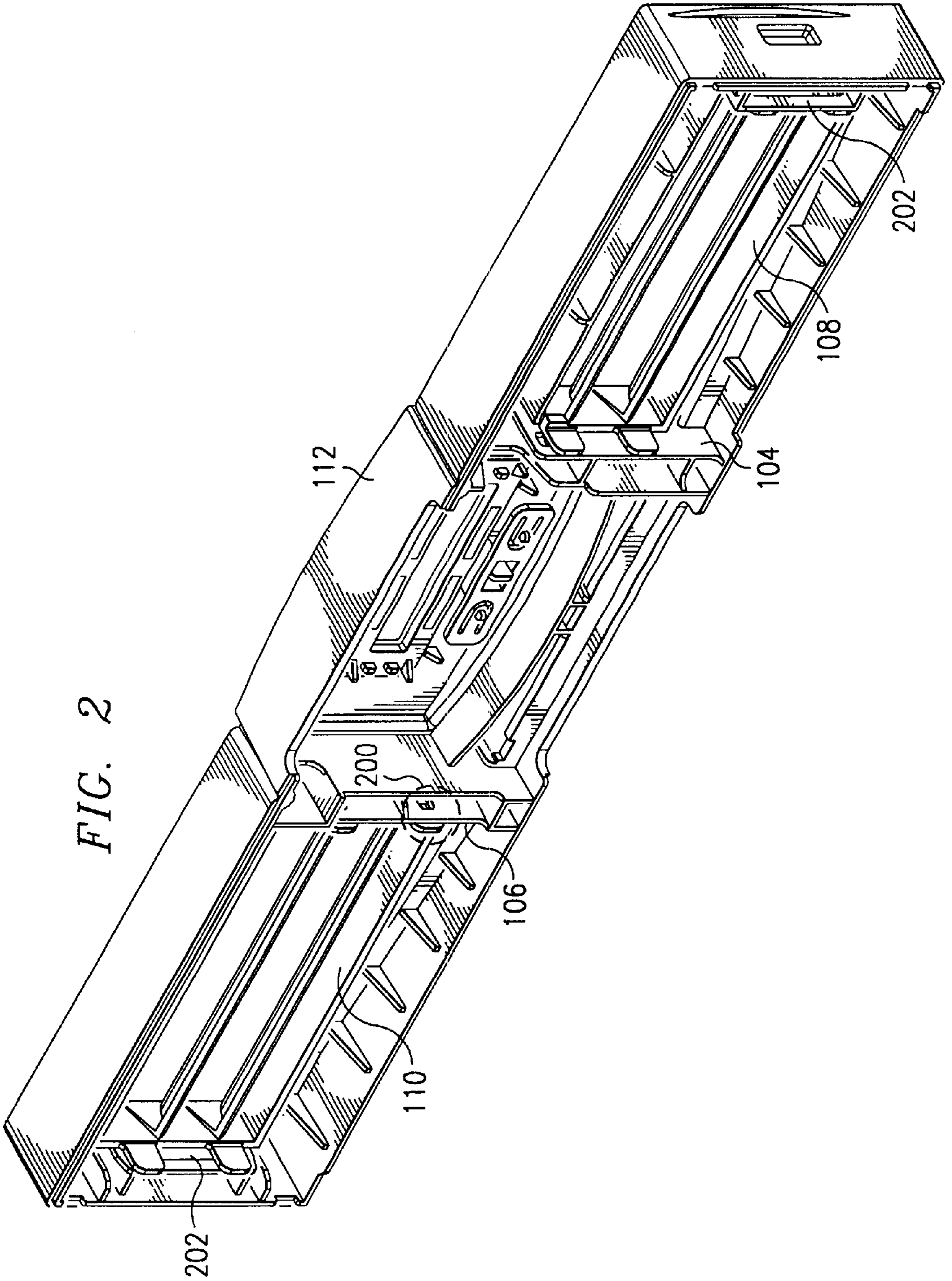
FIG. 2 is an oblique view of the back of the computer enclosure bezel of FIG. 1.
Figure 3:
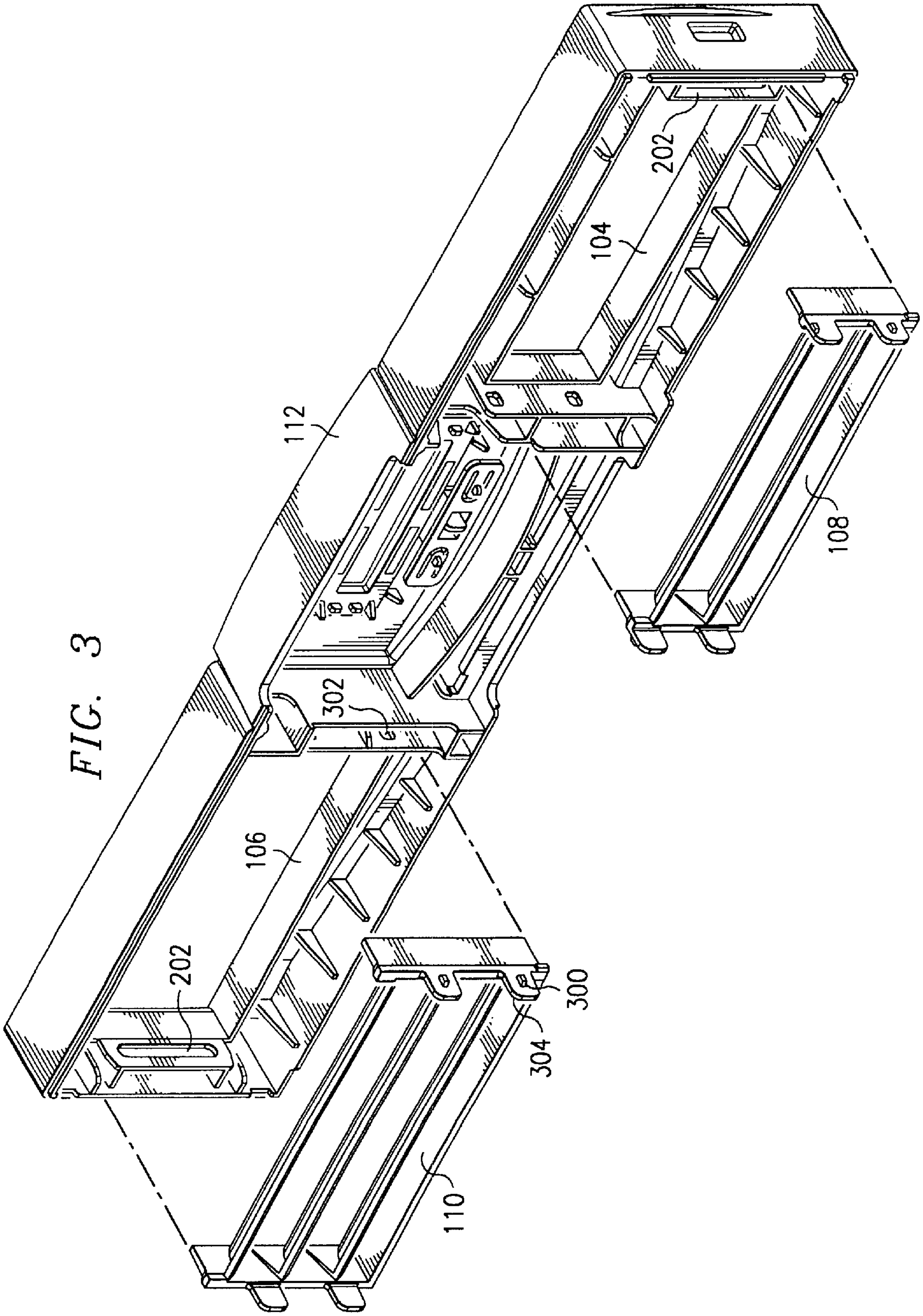
FIG. 3 is an exploded oblique view of the back of the computer enclosure bezel of FIG. 1 shown with louver assemblies removed.
Figure 4:
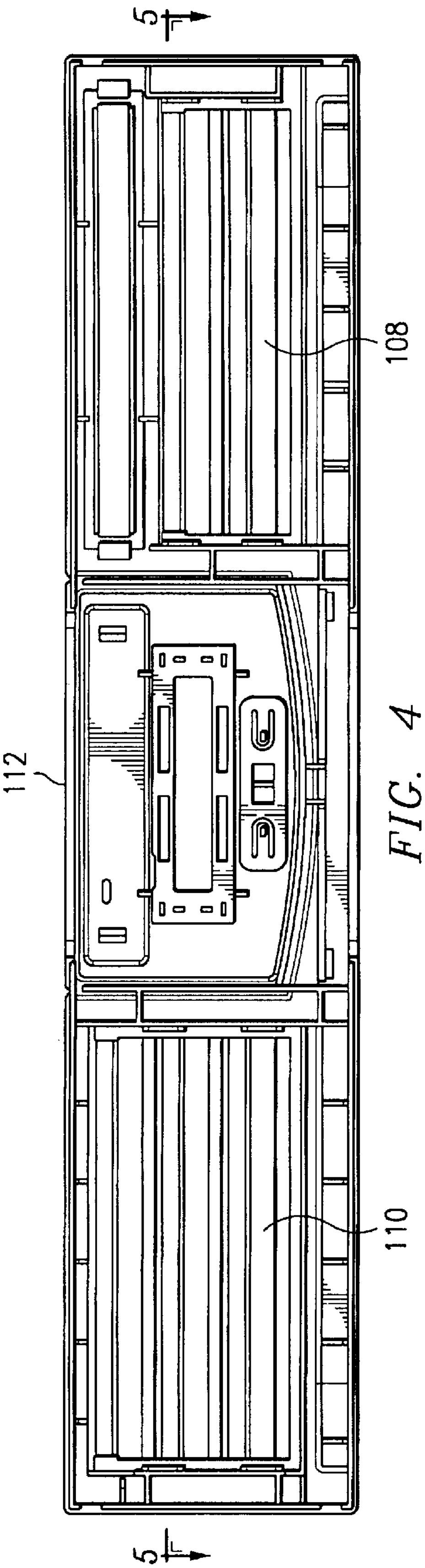
FIG. 4 is an orthogonal view of the back of the computer enclosure bezel of FIG. 1.
Figure 5:
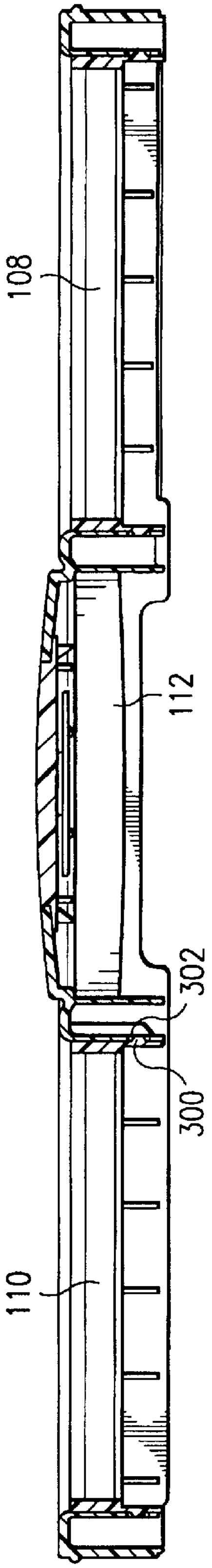
FIG. 5 is a sectional view of the computer enclosure bezel of FIG. 1 taken across section A—A as indicated in FIG. 4.

FIGS. 2 and 3 illustrate bezel 112 and louver assemblies 108, 110 in more detail. When the louver assemblies are installed in their respective openings, they are retained therein by resilient detents 200. In the embodiment shown, each louver assembly is retained by four similar detents 200, two detents on each of the left and rights sides of the louver assembly. In an embodiment the detents, the louver assemblies and the bezel were all made of molded plastic; in alternative embodiments, other suitable materials may be used. Each detent 200 includes a raised portion 300 that engages with a recess, hole or channel 302. In the embodiment shown, raised portion 300 is part of the louver assembly, and the recess 302 is part of the bezel or enclosure. In other embodiments, raised portion 300 may be part of the bezel or enclosure, and the recess 302 may be part of the louver assembly. Tabs 304 help to provide the detent with resilience. Preferably, the detents will be strong enough to retain the louver assemblies in their respective openings during normal operation of the computer; but force applied by hand should be sufficient to dislodge them during a configuration change.

Bezel 112 is optional. When employed, it may be designed so that it is removable from enclosure 102. For example, it may be snapped onto the sides of enclosure 102 by engaging openings or channels 202 with corresponding raised portions or tabs on enclosure 102.

In operation, air vent openings 104, 106 may be configured to suit the environment in which computer 100 will be operated. If computer 100 will be operated in an office or desktop environment, louver assemblies 108, 110 may be snapped into air vent openings 104, 106 to deflect noise and obscure unwanted views of internal computer components. But if computer 100 will be operated in an industrial or rack-mount setting, then louver assemblies 108, 110 may be removed from air vent openings 104, 106 so that they do not impede air flow through the openings.

What is claimed is:

1. A computer, comprising:

a louver assembly; and an enclosure having an opening therein for removably receiving the louver assembly, the opening defining a direction of insertion and a direction of removal for the louver assembly;

wherein, when the louver assembly is in the opening, it is retained therein by a detent, the detent comprising:

a raised portion disposed on a resilient tab; and a recess, hole or channel configured to receive the raised portion;

wherein a surface of the raised portion that faces the direction of insertion slopes away from the direction of insertion, and a surface of the raised portion that faces the direction of removal slopes away from the direction of removal.

2. The computer of claim 1 wherein:

the louver assembly and the detent are made of plastic.

3. The computer of claim 1 wherein:

the resilient tab is located on the louver assembly and the recess, hole or channel is located on the enclosure.

4. The computer of claim 1 wherein:

the resilient tab is located on the enclosure and the recess, hole or channel is located on the louver assembly.

5. The computer of claim 1 wherein:

when the louver assembly is in the opening, it is retained therein by four detents.

6. The computer of claim 5, wherein:

the four detents are disposed as pairs on opposite sides of the louver assembly.

7. A computer, comprising:

a louver assembly;

an enclosure; and a bezel for mounting on the enclosure and having an opening therein for removably receiving the louver assembly, the opening defining a direction of insertion and a direction of removal for the louver assembly;

wherein, when the louver assembly is in the opening, it is retained therein by a detent, the detent comprising:

a raised portion disposed on a resilient tab; and a recess, hole or channel configured to receive the raised portion;

wherein a surface of the raised portion that faces the direction of insertion slopes away from the direction of insertion, and a surface of the raised portion that faces the direction of removal slopes away from the direction of removal.

8. The computer of claim 7, wherein:

the louver assembly, the bezel and the detent are made of plastic.

9. The computer of claim 7 wherein:

the resilient tab is located on the louver assembly and the recess, hole or channel is located on the bezel.

10. The computer of claim 7, wherein:

the resilient tab is located on the bezel and the recess, hole or channel is located on the louver assembly.

11. The computer of claim 7, wherein:

when the louver assembly is in the opening, it is retained therein by four detents.

12. The computer of claim 11, wherein:

the four detents are disposed as pairs on opposite sides of the louver assembly.

* * * * *